(12) United States Patent
Miyata et al.

(10) Patent No.: US 6,903,896 B2
(45) Date of Patent: Jun. 7, 2005

(54) HEAD POSITIONING METHOD, AND DISK APPARATUS USING THE SAME

(75) Inventors: Keizo Miyata, Kyoto (JP); Toshio Inaji, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 167 days.

(21) Appl. No.: 10/606,124

(22) Filed: Jun. 26, 2003

(65) Prior Publication Data

US 2004/0047065 A1 Mar. 11, 2004

(30) Foreign Application Priority Data

Jun. 26, 2002 (JP) .................................. 2002-185760

(51) Int. Cl.[7] .............................................. G11B 5/596
(52) U.S. Cl. ............................. 360/78.06; 360/78.04; 360/77.02
(58) Field of Search .............................. 360/77.02, 75, 360/78.06, 78.04, 78.01; 369/43, 44.19, 44.25, 44.27, 44.35; 318/560

(56) References Cited

U.S. PATENT DOCUMENTS 5,473,550 A 12/1995 Cameron et al.
6,031,684 A 2/2000 Gregg
2002/0181142 A1 * 12/2002 Kokami et al. .......... 360/77.02

FOREIGN PATENT DOCUMENTS

| EP | 1 174 861 A1 | 1/2002 |
| JP | 09-231701 | 9/1997 |
| JP | P2002-42434 A | 2/2002 |
| JP | 2002-251850 A | 9/2002 |

* cited by examiner

Primary Examiner—Andrew L. Sniezek
(74) Attorney, Agent, or Firm—McDermott Will & Emery LLP

(57) ABSTRACT

A disturbance compensation signal is produced by estimating the magnitude of disturbance acting upon an actuator based on a driving signal and a voltage signal generated when driving the actuator. A control signal is produced by multiplying the disturbance compensation signal by a gain adjustment coefficient. A head position error signal is produced based on the target position of a magnetic head and the current position of the magnetic head that is detected based on servo information recorded in advance on a magnetic disk. A gain adjuster obtains the driving signal by adding together the control signal and a position control signal. The actuator is driven with the driving signal output from the gain adjuster.

18 Claims, 7 Drawing Sheets

HEAD POSITIONING METHOD, AND DISK APPARATUS USING THE SAME

FIELD OF THE INVENTION

The present invention relates to a head positioning method for positioning a recording/reproduction head such as a magnetic head or an optical pickup by using an actuator, and a disk apparatus using the same.

BACKGROUND OF THE INVENTION

In recent years, magnetic disk apparatuses have been improved rapidly by decreasing the size and increasing the capacity thereof. The capacity of a magnetic disk apparatus has been increased by increasing the track density of the magnetic disk, and the track pitch will be further reduced in the future. Therefore, in order to record/reproduce data to/from a high-density magnetic disk, it is necessary to quickly and precisely position a magnetic head to the target track among other tracks formed at a small track pitch.

Typically, with a magnetic disk apparatus, servo information, based on which the magnetic head is positioned, is recorded in advance on the magnetic disk at a predetermined angular interval. The magnetic head is positioned based on the servo information. Specifically, the positioning operation is performed at a certain sampling cycle that is determined by the rotational speed of the magnetic disk and the number of servo information recorded per track (the number of servo sectors). The magnetic head reads the servo information at the sampling cycle, whereby a position error signal indicating the positional error of the magnetic head with respect to the target track is produced, and the magnetic head is positioned so that the position error signal is minimized.

In order to precisely position the magnetic head, it is necessary to shorten the sampling cycle, thereby increasing the control frequency of the magnetic head positioning system. However, in order to shorten the sampling cycle, it is necessary that more servo information is recorded on the magnetic disk, which results in a decrease in the data format efficiency. Moreover, the actuator for positioning the head may have a natural vibration mode of higher-order. Therefore, if the control frequency is increased in order to increase the positioning precision, the positioning system may become unstable due to the natural vibration. In practice, since the control band is limited by the natural vibration of the actuator itself, there is a limit to increasing the control frequency of the positioning system.

Moreover, as the size of magnetic disk apparatuses has been decreased in recent years, disturbance such as the bearing friction force that acts upon the actuator or the elastic force of the flexible print circuit (FPC) that connects the actuator with a circuit substrate presents a factor that further deteriorates the positioning precision. In view of this, techniques have been proposed in the art for improving the positioning precision by compensating for such disturbance. For example, Japanese Laid-Open Patent Publication No. 9-231701 proposes a head positioning method, in which a head position signal is obtained from servo information recorded on the magnetic disk, and external forces are compensated for by disturbance estimation means that receives the head position signal and an actuator driving signal. With this technique, the actuator driving signal is obtained by adding together a disturbance compensation signal produced by the disturbance estimation means and a position control signal produced by using a position error signal that indicates the positional error of the magnetic head.

With this head positioning method, however, when positioning the magnetic head at the target track, i.e., when moving the magnetic head at a high velocity toward the target track from another track (seek operation), the position control signal may overshoot, whereby the driving signal itself is unstable. In such a case, the disturbance estimation means, which uses the driving signal as an input, cannot produce an appropriate disturbance compensation signal by accurately estimating the disturbance acting upon the actuator. As a result, it may become difficult to accurately position the magnetic head at the target track, or the magnetic head may take a long time following the target track, thereby lowering the performance of the magnetic disk apparatus.

Note that this is not a problem particular to magnetic disk apparatuses, but is a common problem among disk apparatuses in general.

SUMMARY OF THE INVENTION

The present invention has been made in view of the above, and has an object to provide a head positioning method with which the head can start following the target track with a high precision within a short period of time from when the head starts moving toward the target position, and a reliable disk apparatus using the same.

In order to achieve the object set forth above, the present invention provides a head positioning method for positioning a head with respect to a disk by using an actuator including a voice coil motor, an arm fixed to the voice coil motor, and the head attached to the arm, the method including the steps of: producing a disturbance compensation signal by estimating a magnitude of disturbance acting upon the actuator based on a driving signal for driving the actuator and a voltage signal indicating a voltage that is generated across the voice coil motor when driving the actuator; producing a control signal by multiplying the disturbance compensation signal by a gain adjustment coefficient, which is a constant other than 1 or a variable that takes a value other than 1 at any point in time; calculating a head position error based on a target position and a head position that is obtained by detecting, with the head, servo information recorded in advance on the disk, so as to produce a position control signal corresponding to the head position error; and producing the driving signal by adding together the control signal and the position control signal.

A disk apparatus of the present invention includes: an actuator including a voice coil motor, an arm fixed to the voice coil motor, and a head attached to the arm; driveer for driving the actuator; voltage detector for outputting a voltage signal indicating a voltage that is generated across the voice coil motor when driving the actuator; disturbance estimator for producing a disturbance compensation signal by estimating a magnitude of disturbance acting upon the actuator based on a driving signal input to the driver and the voltage signal; position error detector for calculating a head position error based on a target position and a head position that is obtained by detecting, with the head, servo information recorded in advance on a disk; position controller for producing and outputting a position control signal corresponding to the head position error; and gain adjuster for producing a control signal by multiplying the disturbance compensation signal by a gain adjustment coefficient, which is a constant other than 1 or a variable that takes a value other than 1 at any point in time, and producing the driving signal by synthesizing the control signal with the position control signal.

In the head positioning method and the disk apparatus of the present invention, the driving signal for driving the actuator for positioning the head is produced by adding together the control signal (obtained by multiplying the disturbance compensation signal, which is obtained by estimating the magnitude of disturbance acting upon the actuator, by the gain adjustment coefficient) and the position control signal (produced based on the error signal corresponding to the head position error between the head position and the target position). Even if the driving signal has become unstable in a seek operation, etc., so that the disturbance compensation signal cannot be produced accurately, it is still possible to make the head quickly and precisely follow the target track by adjusting the gain of the disturbance compensation signal with the gain adjustment coefficient. For example, when the disturbance compensation signal has become unstable due to an overshoot phenomenon, or the like, the gain adjustment coefficient during a seek operation can be set to a slightly smaller value so as to reduce the contribution of the unstable disturbance compensation signal to the positioning system, whereby it is possible to make the head quickly and precisely follow the target track.

It is preferred that the gain adjustment coefficient is a variable; and the gain adjustment coefficient is varied according to the head position error.

It is preferred that the gain adjustment coefficient is increased over time. Alternatively, the gain adjustment coefficient may be brought closer to a predetermined value over time. Alternatively, the gain adjustment coefficient may be brought closer to 1 over time.

It is preferred that the gain adjustment coefficient in a seek mode is set to be smaller than that in a following mode. It is preferred that when the head position error is greater than a predetermined threshold position error amount, the gain adjustment coefficient is set to be smaller than that when the head position error is less than or equal to the threshold position error amount. The gain adjustment coefficient in the transitional from the start of a seek operation to a following operation may be set to be smaller than that in a following mode. In this way, even if the disturbance compensation signal has become unstable in the transition from a seek operation to a following operation, the contribution of the disturbance compensation signal to the positioning system can be reduced, whereby it is possible to transition to a following operation within a short period of time.

It is preferred that the gain adjustment coefficient is increased over time, starting from a point in time when the head position error transitions from being greater than the threshold position error amount to being less than or equal to the threshold position error amount.

It is preferred that the threshold position error amount is smaller than twice a recording track pitch of the disk. By the time the operation transitions to a following operation with the head position error being reduced to be about twice the recording track pitch, the driving signal is stable, whereby it is possible to accurately estimate the magnitude of disturbance acting upon the actuator. Therefore, the gain adjustment coefficient, by which the disturbance compensation signal is to be multiplied, may be increased gradually so as to maximize the disturbance compensation effect. As a result, it is possible to make the head follow the target track within a short period of time, thereby improving the performance of the disk apparatus.

As described above, according to the present invention, the control signal is produced by multiplying the disturbance compensation signal by the gain adjustment coefficient, and the driving signal for driving the actuator is obtained by adding together the control signal and the position control signal. Thus, the value of the gain adjustment coefficient by which the disturbance compensation signal is to be multiplied according to the current state, e.g., a following state or a transitional state from a seek operation to a following operation, the transition from the current track position to the target track, i.e., the transition from a seek operation to a following operation, can be made stably and quickly. Moreover, in a state where the head is stably following the current track position, it is possible to suppress off-track due to disturbance, thereby allowing for a stable and precise positioning operation. With such a head positioning method, it is possible to realize a high-performance, reliable disk apparatus.

DESCRIPTION OF THE PREFERRED EMBODIMENTS

An embodiment of the present invention will now be described with reference to the drawings. The present embodiment is directed to a magnetic disk apparatus.

Figure 1:
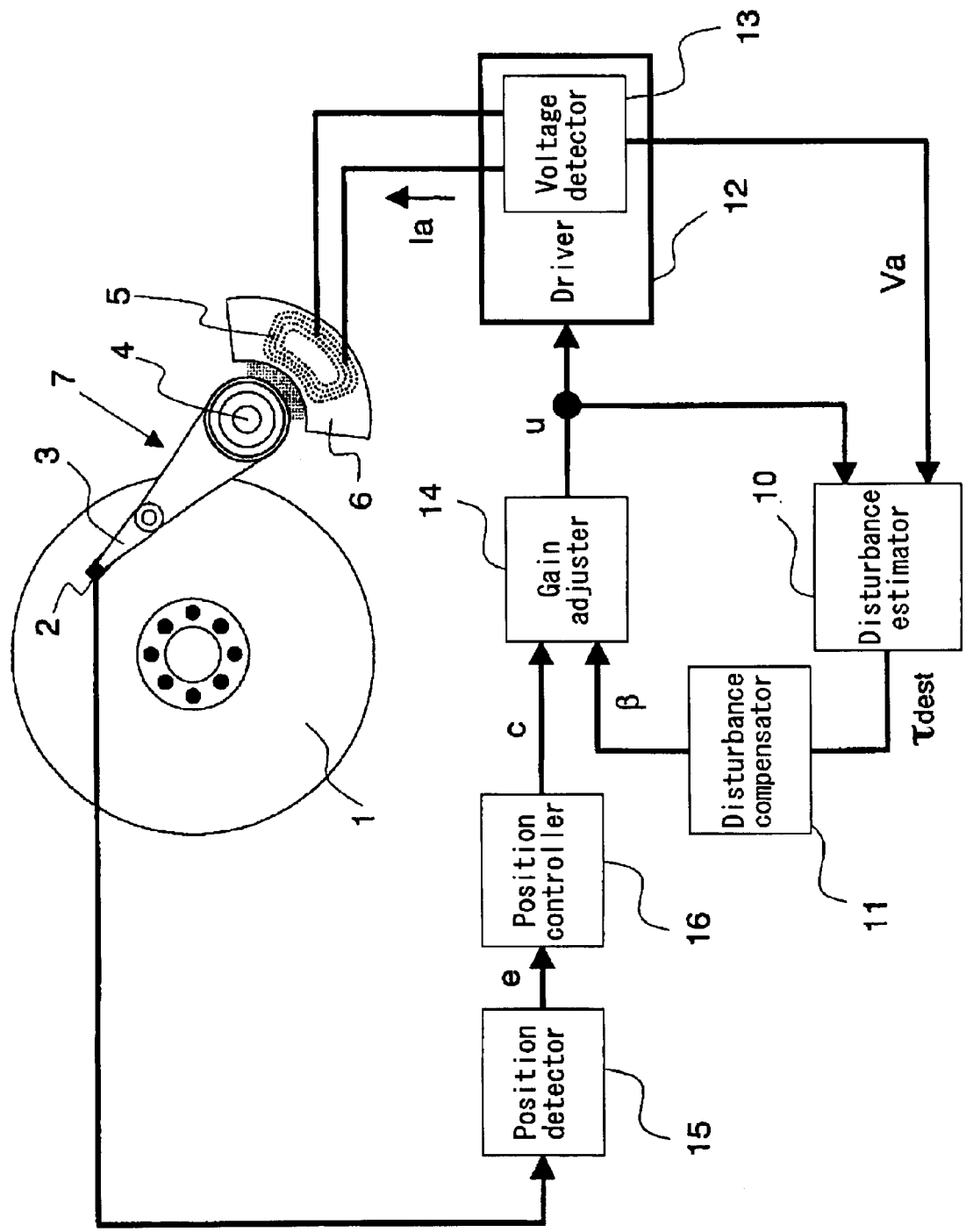
FIG. 1 is a block diagram illustrating the configuration of a main part of a magnetic disk apparatus according to an embodiment of the present invention.
Figure 2:
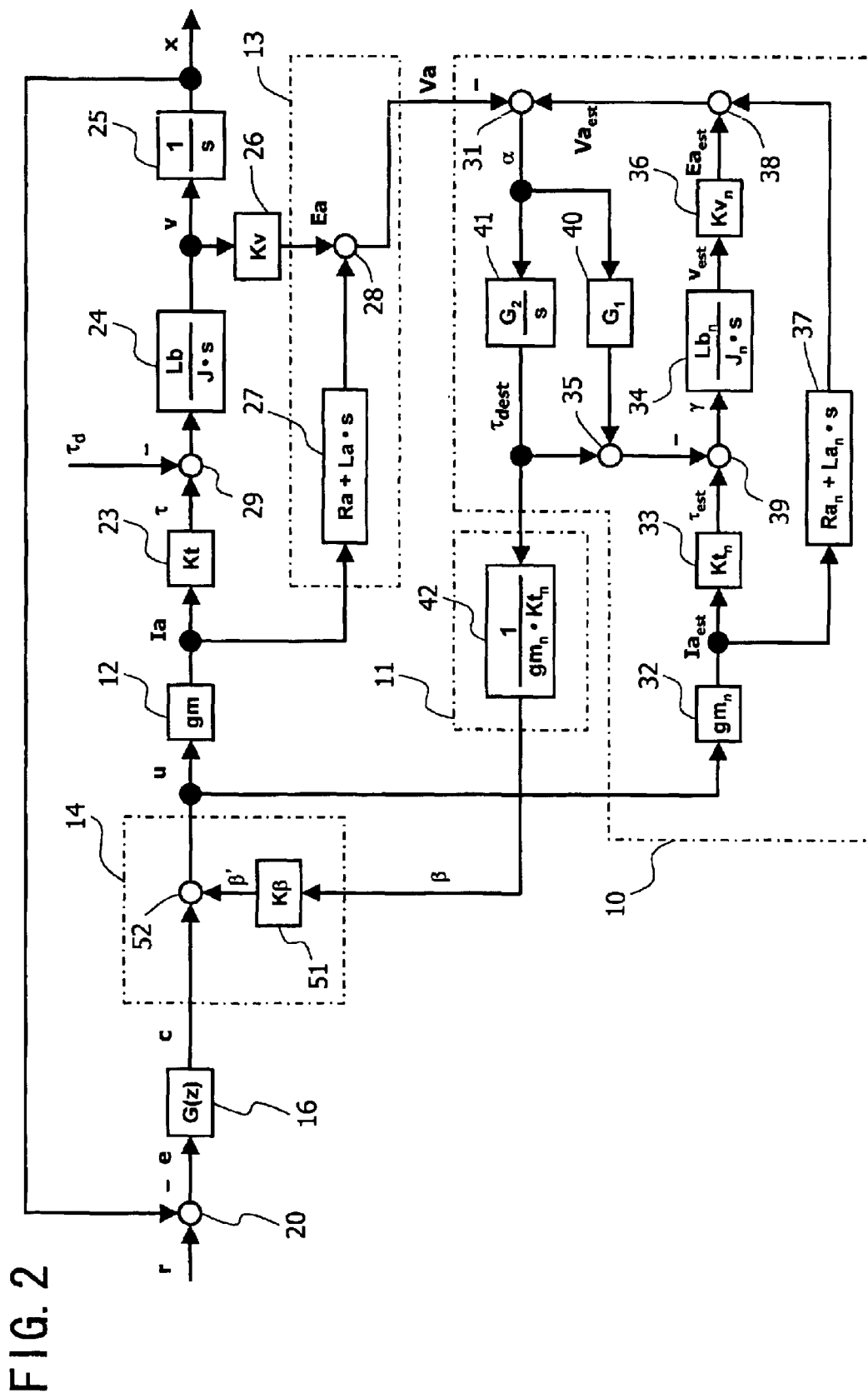
FIG. 2 is a block diagram illustrating the general configuration of a positioning system according to an embodiment of the present invention.
Figure 3:
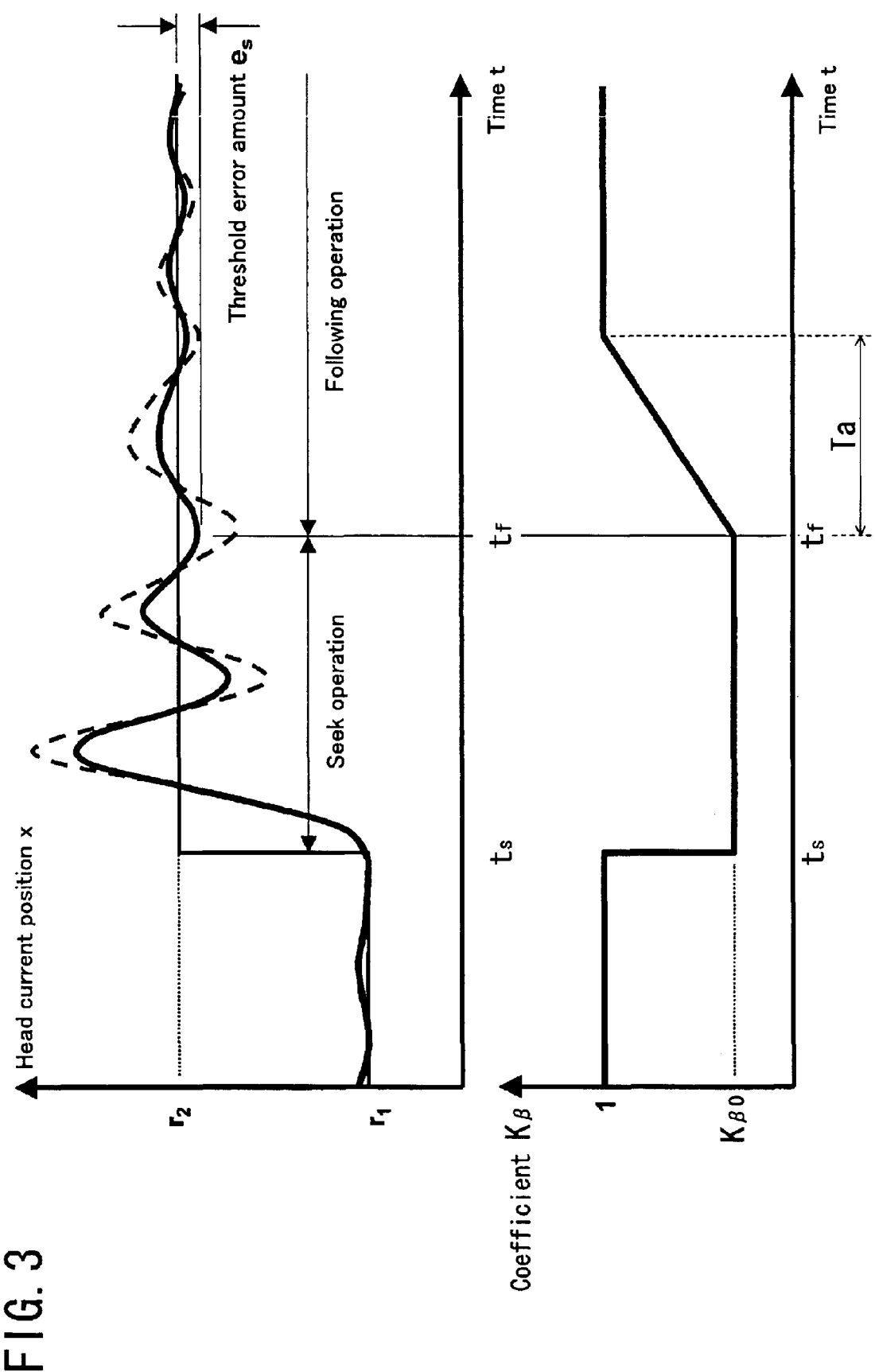
FIG. 3 illustrates the operation of a gain adjuster according to an embodiment of the present invention.

FIG. 1, FIG. 2 and FIG. 3 illustrate the disk apparatus and the positioning method of the present embodiment. FIG. 1 is a block diagram illustrating the configuration of a main part of the disk apparatus, FIG. 2 is a block diagram illustrating the general configuration of a positioning system of the disk apparatus, and FIG. 3 illustrates the operation of a gain adjuster.

Referring to FIG. 1, a magnetic disk 1 is spun by a spindle motor (not shown). A magnetic head 2 is provided for recording/reproducing data to/from the magnetic disk 1, and is mounted at one end of an arm 3. The arm 3 pivots about a bearing 4 to move the magnetic head 2 toward the target track on the magnetic disk 1. A driving coil 5 is provided at the other end of the arm 3, and a magnet (not shown) is provided on one surface of a stator 6 that is facing the driving coil 5. The arm 3 receives a turning power from the interaction between the magnetic flux produced by the magnet provided on the stator 6 and the magnet field produced by the current passed through the driving coil 5. The driving coil 5 and the stator 6 together form a voice coil motor (VCM). The magnetic head 2, the arm 3, the bearing 4, the driving coil 5 and the stator 6 together form an actuator 7.

A driver 12 passes a driving current Ia corresponding to a driving signal u through the driving coil 5 to drive the actuator 7. As the actuator 7 is driven, a voltage detector 13 included in the driver 12 detects the voltage that is generated between the opposite ends of the driving coil 5 while driving the actuator 7, so as to output a voltage signal Va indicating the detected voltage. A disturbance estimator 10 estimates a disturbance torque acting upon the actuator 7 based on the voltage signal Va, which is output from the voltage detector 13, and the driving signal u, which is input to the driver 12, to output a disturbance estimation signal $\tau_{dest}$. A disturbance compensator 11 corrects the disturbance estimation signal $\tau_{dest}$, output from the disturbance estimator 10 to output a disturbance compensation signal β.

Figure 4:
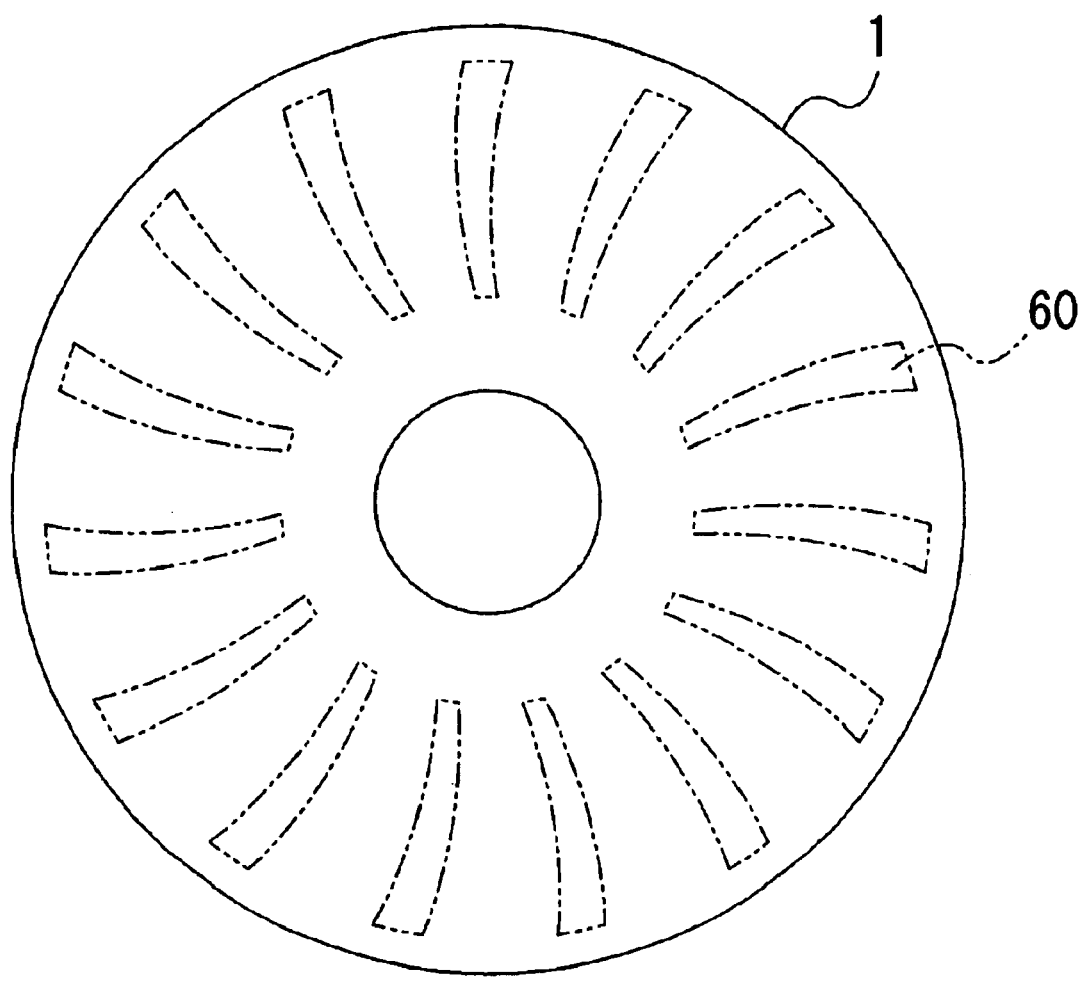
FIG. 4 is a conceptual diagram illustrating position data on a magnetic disk.

As illustrated in FIG. 4, track position data 60 (servo information) is recorded in advance on the magnetic disk 1 at a predetermined angular interval. The position data 60 is read by the magnetic head 2 at a predetermined sampling cycle and is output as a position signal. Note that although the number of servo information (the number of servo sectors) is only 15 in FIG. 4 for ease of understanding, the number of servo information recorded is typically much larger (e.g., 100 to 300).

A position detector 15 detects a current position x of the magnetic head 2 based on the position signal read by the magnetic head 2 to produce a position error signal e indicating the difference between the current position x and a target position r, i.e., the position of the target track. A position controller 16 performs amplification and phase compensation operations on the position error signal e from the position detector 15 to produce a position control signal c.

Next, the operation of the positioning system of the disk apparatus of the present embodiment will be described with reference to FIG. 2. Note that in FIG. 2, "s" represents a Laplace operator. Moreover, in FIG. 2, th hold element occurring while sampling the servo information is omitted for the sake of simplicity.

In FIG. 2, the head position error e with respect to the target track position r can be expressed by Expression (1), where x denotes the current track position detected by the magnetic head 2. The position error signal e is obtained at a comparator 20.

$$e = r - x \quad (1)$$

The position controller 16 performs a digital filtering operation with the transfer function G(z) on the position error signal e output from the comparator 20 to produce the position control signal c. Then, the position controller 16 outputs the position control signal c to a gain adjuster 14. In the positioning system, an ordinary PID control is performed, and the transfer function of the position controller 16 is expressed by Expression (2).

$$G(z) = K_d \left[ 1 + h(1 - z^{-1}) + L \frac{z^{-1}}{1 - z^{-1}} \right] \quad (2)$$

In this expression, $z^{-1}$ denotes a one-sample delay, and $K_d$ denotes the proportional gain of the positioning system. The coefficients h and L are constants representing frequency characteristics, h being a differential coefficient and L being an integral coefficient. The position control signal c is turned into the driving signal u through the gain adjuster 14. The driving signal u is converted by the driver 12 having the transfer function gm from a voltage signal into a current signal that is gm times the voltage signal. The driver 12 outputs the driving current Ia. In the actuator 7, the driving current Ia passed through the driving coil 5 is converted with the transfer function Kt of a block 23 into a driving torque τ through the interaction between the magnet field produced by the driving current Ia and the magnetic flux produced by the magnet (not shown) of the stator 6 described above. Herein, the transfer function Kt is the torque constant of the actuator 7. The transfer function (Lb/J·s) of a block 24 represents the characteristic of the transfer from the driving torque τ acting upon the arm 3 to the traveling velocity v of the magnetic head 2. Herein, J denotes the moment of inertia of the arm 3, and Lb denotes the distance from the bearing 4 of the arm 3 to the magnetic head 2. A block 25 is an integrator, and the transfer function thereof is represented as 1/s. In the integrator of the block 25, the traveling velocity v of the magnetic head 2 is converted into the current track position x.

The disturbance $\tau_d$ acting upon the arm 3 of the actuator 7 (such as the bearing friction on the actuator 7, the elastic force of the flexible print circuit that connects the actuator 7 with an electronic circuit substrate, or the inertial force acting upon the actuator 7 from the external impact or vibration on the magnetic disk apparatus) is expressed in a form that is suitable as an input to a comparator 29 preceding the block 24.

As the actuator 7 pivots, an induced voltage Ea proportional to the pivoting speed of the actuator 7 occurs between the opposite ends of the driving coil 5. Ea is expressed by Expression (3).

$$Ea = \frac{Lb \cdot Kv}{J \cdot s} (\tau - \tau_d) \quad (3)$$

A one-dot-chain-line block including a block 27 and an adder 28 is the voltage detector 13. The voltage detector 13 produces the voltage signal Va by adding together, at the adder 28, the induced voltage Ea output from a block 26 and a voltage drop (Ra+La·s)·Ia that occurs as the driving current Ia is passed through the driving coil 5. Then, the voltage detector 13 outputs the voltage signal Va. The voltage signal Va is expressed by Expression (4).

$$Va = Ea + (Ra + La \cdot s)Ia \quad (4)$$

In this expression, Ra denotes the coil resistance of the driving coil 5, and La denotes the inductance of the driving coil 5.

Note that the value of the voltage drop (Ra+La·s)·Ia is significantly greater than that of the induced voltage Ea, typically by some tens to some hundreds times. Therefore, when estimating the disturbance based on the induced voltage Ea, it is important to grasp as accurately as possible the influence of the voltage drop. In the present embodiment, precise disturbance estimation is realized by faithfully reproduce the value of the voltage drop at the disturbance estimator 10 (see a block 37 in FIG. 2) as will be described later.

Based on Expression (3) and Expression (4), the voltage signal Va is expressed as Expression (5).

$$Va = \frac{Lb \cdot Kv}{J \cdot s} (\tau - \tau_d) + (Ra + La \cdot s)Ia \quad (5)$$

A one-dot-chain-line block on the lower right in FIG. 2 is the disturbance estimator 10 of FIG. 1. The disturbance estimator block 10 includes blocks 32, 33, 34, 36 and 37 having substantially the same transfer functions as those of the blocks 12, 23, 24, 26 and 27, respectively. In the disturbance estimator block 10, the suffix "n" to a constant indicates that it is a nominal value, and a variable with the "est" is an estimated value.

The driving signal u, which is input to the driver block 12, is also input to the disturbance estimator block 10. The driving signal u is multiplied by ($gm_n \cdot Kt_n$) through the block 32 and the block 33 to obtain a driving torque estimation signal $\tau_{est}$, which is an estimated value of the driving torque $\tau$ acting upon the arm 3 of the actuator 7.

A velocity estimation signal $v_{est}$ is output from the block 34. In the block 36, the velocity estimation signal $v_{est}$ is multiplied by $Kv_n$ to produce an induced voltage estimation signal $Ea_{est}$. The induced voltage estimation signal $Ea_{est}$ and the voltage drop ($Ra_n + La_n \cdot s$)·$Ia_{est}$, which occurs as a driving current estimation signal $Ia_{est}$ is passed through the driving coil 5, are added together by an adder 38, which outputs a voltage estimation signal $Va_{est}$. The voltage estimation signal $Va_{est}$ is input to a comparator 31, where it is compared with the actually detected voltage signal Va to yield an error signal $\alpha$ (=$Va_{est}$–Va). The error signal $\alpha$ is input to an integrator represented by a block 41, and to a multiplier represented by a block 40. The integrator 41 integrates the error signal a to output the disturbance estimation signal $\tau_{dest}$ indicating the estimated value of disturbance. The error signal $\alpha$ is input to the multiplier represented by the block 40, where it is multiplied by $G_1$ and output to an adder 35. A subtractor 39 receives the output of the adder 35 and outputs, to the block 34, $\gamma$ obtained by subtracting the output of the adder 35 from the driving torque estimation signal $\tau_{est}$ output from the block 33.

Note that the coefficient $G_1$ of the block 40 and the coefficient $G_2$ of the block 41 are constants for stabilizing the operation of the disturbance estimator 10, and will later be described in detail.

A block 42 included in the disturbance compensator 11 multiplies the disturbance estimation signal $\tau_{dest}$ by $1/(gm_n \cdot Kt_n)$ to produce the disturbance compensation signal $\beta$ that is required for causing the arm 3 to generate a driving force having a magnitude corresponding to the disturbance estimation signal $\tau_{dest}$. The disturbance compensation signal $\beta$ is passed to the gain adjuster 14, where it is multiplied by a gain adjustment coefficient $K_\beta$ to yield a control signal $\beta'$, which is then synthesized with the position control signal c. The driving signal u is produced from the control signal $\beta'$ and the position control signal c.

Next, the operation of the disturbance estimator 10 will be described. The disturbance estimation signal $\tau_{dest}$ output from the block 41 is expressed by Expression (6).

$$\tau_{dest} = \frac{G_2}{s}(Va_{est} - Va) \quad (6)$$

Moreover, the output $\gamma$ from the subtractor 39 is expressed by Expression (7).

$$\gamma = \tau_{est} - \left(G_1 + \frac{G_2}{s}\right) \cdot (Va_{est} - Va) \quad (7)$$

Furthermore, the voltage estimation signal $Va_{est}$ is expressed by Expression (8).

$$Va_{est} = Ea_{est} + (Ra_n + La_n \cdot s)Ia_n \quad (8)$$

The induced voltage estimation signal $Ea_{est}$ is expressed by Expression (9).

$$Ea_{est} = \frac{Lb_n \cdot Kv_n}{J_n \cdot s} \cdot \gamma \quad (9)$$

Expression (8) can be transformed into Expression (10) based on Expression (7) and Expression (9).

$$Va_{est} = \frac{Lb_n \cdot Kv_n}{J_n \cdot s}\left[\tau_{est} - \left(G_1 + \frac{G_2}{s}\right) \cdot (Va_{est} - Va)\right] + \quad (10)$$
$$(Ra_n + La_n \cdot s)Ia_{est}$$

For the sake of simplicity, it is assumed that the value of the transfer function gm of the driver block 12 is equal to that of the transfer function $gm_n$ of the block 32. Thus, the driving current Ia is equal to the driving current estimation signal $Ia_{est}$. Furthermore, assuming that Ra and La of the block 27 are equal to $Ra_n$ and $La_n$ of the block 37, respectively, the voltage drop (Ra+La·s)Ia that occurs as the driving current Ia is passed through the driving coil 5 is equal to the voltage drop ($Ra_n + La_n \cdot s$)$Ia_{est}$ that occurs as the driving current estimation signal $Ia_{est}$ is passed therethrough. Thus, Expression (11) holds.

$$(Ra+La \cdot s)Ia = (Ra_n + La_n \cdot s)Ia_{est} \quad (11)$$

Moreover, assuming Expression (12) holds, $$\frac{Lb \cdot Kv}{J} = \frac{Lb_n \cdot Kv_n}{J_n} \quad (12)$$

subtracting the left and right sides of Expression (5) from the left and right sides of Expression (10), respectively, while using Expression (11), yields Expression (13).

$$Va_{est} - Va = \frac{Lb_n \cdot Kv_n}{J_n \cdot s}\left[\tau_{est} - \tau - \left(G_1 + \frac{G_2}{s}\right) \cdot (Va_{est} - Va) + \tau_d\right] \quad (13)$$

The driving torque estimation signal $\tau_{est}$ represents an estimated value of the driving torque $\tau$ of the actuator 7. Assuming that $\tau_{est}$ is equal to $\tau$. Expression (13) can be rewritten as Expression (14).

$$Va_{est} - Va = \frac{Lb_n \cdot Kv_n}{J_n \cdot s}\left[\tau_d - \left(G_1 + \frac{G_2}{s}\right) \cdot (Va_{est} - Va)\right] \quad (14)$$

By transforming Expression (12) using Expression (6), one can derive the relationship between the disturbance $\tau_d$ acting upon the actuator 7 and the disturbance estimation signal $\tau_{dest}$, obtaining Expression (15).

$$\tau_{dest} = \frac{\frac{Lb_n \cdot Kv_n}{J_n} \cdot G_2}{s^2 + \frac{Lb_n \cdot Kv_n}{J_n} \cdot G_1 \cdot s + \frac{Lb_n \cdot Kv_n}{J_n} \cdot G_2} \cdot \tau_d \quad (15)$$

It can be seen from Expression (15) that the disturbance estimator 10 is capable of estimating the actual disturbance $\tau_d$ with a secondary delay system from the driving signal u and the voltage signal Va through the loop in the one-dot-chain-line block of FIG. 2.

Where the natural angular frequency (estimated angular frequency) of the secondary delay system is denoted by $\omega_e$ and the damping factor is denoted by $\zeta$, the constants $G_1$ and $G_2$ for stabilizing the operation of the disturbance estimator 10 can be expressed as Expression (16) and Expression (17), respectively.

$$G_1 = 2\zeta\omega_e \cdot \frac{J_n}{Lb_n \cdot Kv_n} \quad (16)$$

$$G_2 = \omega_e^2 \cdot \frac{J_n}{Lb_n \cdot Kv_n} \quad (17)$$

Then, Expression (15) can be expressed as Expression (18).

$$\tau_{dest} = \frac{\omega_e^2}{s^2 + 2\zeta\omega_e \cdot s + \omega_e^2} \cdot \tau_d \quad (18)$$

Therefore, it is possible to accurately estimate the disturbance $\tau_d$ (such as the bearing friction on the actuator 7, the elastic force of the flexible print circuit that connects the actuator 7 with an electronic circuit substrate, or the inertial force acting upon the actuator 7 from the external impact or vibration) based on the disturbance estimation signal $\tau_{dest}$ output from the disturbance estimator 10.

Next, the operation of the gain adjuster block 14 will be described. The gain adjuster 14 receives the position control signal c and the disturbance compensation signal β, and outputs the driving signal u. Specifically, the gain adjuster 14 multiplies, at a multiplier represented by a block 51, the disturbance compensation signal β by $K_\beta$ to produce the control signal β'. Then, the control signal β' and the position control signal c are added together by an adder 52 to produce the driving signal u. Thus, the driving signal u is expressed by Expression (19).

$$u = c + K_\beta \cdot \beta \quad (19)$$

In the present embodiment, the gain adjustment coefficient $K_\beta$, which is the transfer function of the block 51, is varied according to the magnitude of the difference (head position error) e between the current position x of the magnetic head 2 and the target position r. FIG. 3 illustrates an exemplary transition of the head position when the head is initially positioned at a position $r_1$ and a seek operation is initiated at time $t_s$ so as to make the head follow a position $r_2$. FIG. 3 also illustrates an exemplary transition of the value of the gain adjustment coefficient $K_\beta$. The solid-line head following curve represents a case where the gain adjustment coefficient $K_\beta$ is varied according to the head position error. Note that how the gain adjustment coefficient $K_\beta$ is varied will later be described in detail. On the other hand, the broken-line head following curve represents a case where the gain adjustment coefficient $K_\beta$ is fixed to 1 (a constant value). In other words, the latter represents a case where the block 51 is absent so that the disturbance compensation signal β is directly passed to the adder 52.

Next, how the gain adjustment coefficient $K_\beta$ is varied in the present embodiment will be described.

When the head is stably following the position $r_1$, the gain adjustment coefficient $K_\beta$ is set to 1. When the gain adjustment coefficient $K_\beta$ is set to 1, the control signal β', which is obtained by multiplying the disturbance compensation signal β by $K_\beta$, is equal to the disturbance compensation signal β. On the other hand, the disturbance compensation signal β is obtained by multiplying the disturbance estimation signal $\tau_{dest}$ by $1/(gm_n \cdot Kt_n)$, and causes the arm 3 of the actuator 7 to generate a driving force having a magnitude corresponding to the disturbance estimation signal $\tau_{dest}$. Therefore, the disturbance estimation signal $\tau_{dest}$ can be acted upon the actuator 7 so as to cancel out the disturbance $\tau_d$, such as the bearing friction on the actuator 7, the elastic force of the flexible printed wiring board, or the inertial force from the external impact or vibration. Thus, it is possible to suppress off-track due to disturbance, thereby allowing for a very stable and precise positioning operation.

On the other hand, in a seek operation from the position $r_1$ to the position $r_2$, it is preferred that the head starts following the position $r_2$ within a short period of time. However, when the head is moved at a high velocity in order to realize such a seek operation, some residual head velocity may result in an overshoot phenomenon as illustrated in FIG. 3. In such a case, the position control signal c reflects the overshoot phenomenon. As a result, the driving signal u becomes unstable. When the driving signal u is an unstable signal, it is difficult for the disturbance estimator 10, which uses the driving signal u as its input, to accurately estimate the disturbance $\tau_d$. Thus, the disturbance estimation signal $\tau_{dest}$ may become inaccurate. Therefore, the head can arrive at the target position r within a shorter period of time by reducing the contribution of the disturbance compensation signal β to the driving signal u during the period in which the overshoot phenomenon is likely to occur, i.e., from the start of a seek operation until when the head starts following the target position r.

Specifically, at time $\tau_s$ at which a seek operation starts, the value of the gain adjustment coefficient $K_\beta$ is set to $K_{\beta0}$, which is smaller than 1, so that the contribution of the position controller 16 is dominant in the head positioning operation, as illustrated in FIG. 3. Although the specific value of $K_{\beta0}$ may vary depending upon the amount of overshoot in a seek operation, it is preferably 0.5 or less. In the present embodiment, the value of $K_{\beta0}$ is 0.2.

When the head positioning operation is started by starting a seek operation at time $t_s$, the position error of the head position with respect to the target position $r_2$ is greater than a predetermined threshold position error amount. Specifically, the position error signal e is greater than a threshold position error signal $e_s$ corresponding to threshold position error amount. However, the position error signal e gradually decreases to be less than or equal to the threshold position error signal $e_s$. When the position error signal e becomes less than or equal to the threshold position error signal $e_s$ (at time $t_f$), it can be assumed that the driving signal u is a stable signal and the disturbance can be estimated accurately. In view of this, the value of the gain adjustment coefficient $K_\beta$ is brought closer to 1 in proportion to time so as to finally maximize the disturbance compensation effect. Note that how the gain adjustment coefficient $K_\beta$ is brought closer to 1 after the position error signal e reaches the threshold position error signal $e_s$ is not limited to increasing the gain adjustment coefficient $K_\beta$ in proportion to time, but may alternatively be increasing the gain adjustment coefficient $K_\beta$ in a stepped or curved manner, for example.

The amount of time Ta (transitional period) in which the value of the gain adjustment coefficient $K_\beta$ is brought from $K_{\beta0}$ to 1 may be any appropriate value that is determined based on any of various criteria. For example, the amount of time Ta may be a value corresponding to a predetermined number of servo sectors on the magnetic disk 1. In such a case, the amount of time Ta is preferably a value corresponding to about 8 to 12 servo sectors. Alternatively, the amount of time Ta may be a predetermined value that is irrelevant to servo sectors. For example, the amount of time Ta may be set to 0.1 msec (milliseconds) to 1 msec. In the present embodiment, the amount of time Ta is set to a value corresponding to 10 servo sectors of the magnetic disk 1. In such a case, the amount of time Ta is about 0.46 msec, where the disk rotational speed is 7200 rpm and the total number of servo sectors of the magnetic disk 1 is 180. Note however that the amount of time Ta is not limited to any particular value.

When the distance the head travels in a seek operation is large, e.g., a few tracks or more, there will be a relatively large residual head velocity in the vicinity of the target position r, thereby causing an overshoot phenomenon as illustrated in FIG. 3 and thus making the position control signal c an unstable signal. However, when the head is within two tracks or less from the target position r, the head traveling velocity itself is small, and the position control signal c is relatively stable, whereby a substantial overshoot phenomenon is unlikely to occur. Therefore, it is believed that the threshold position error amount is preferably two tracks or less. Note that the threshold position error amount is one track in the present embodiment. Note however that the threshold position error amount can of course be any value suitable for the characteristics of the disk apparatus.

As is apparent from FIG. 3, the head can arrive at the target position r within a shorter period of time when the gain adjustment coefficient $K_\beta$ is variable, as compared with the head following curve for the gain adjustment coefficient $K_\beta$=const.=1.

Figure 5:
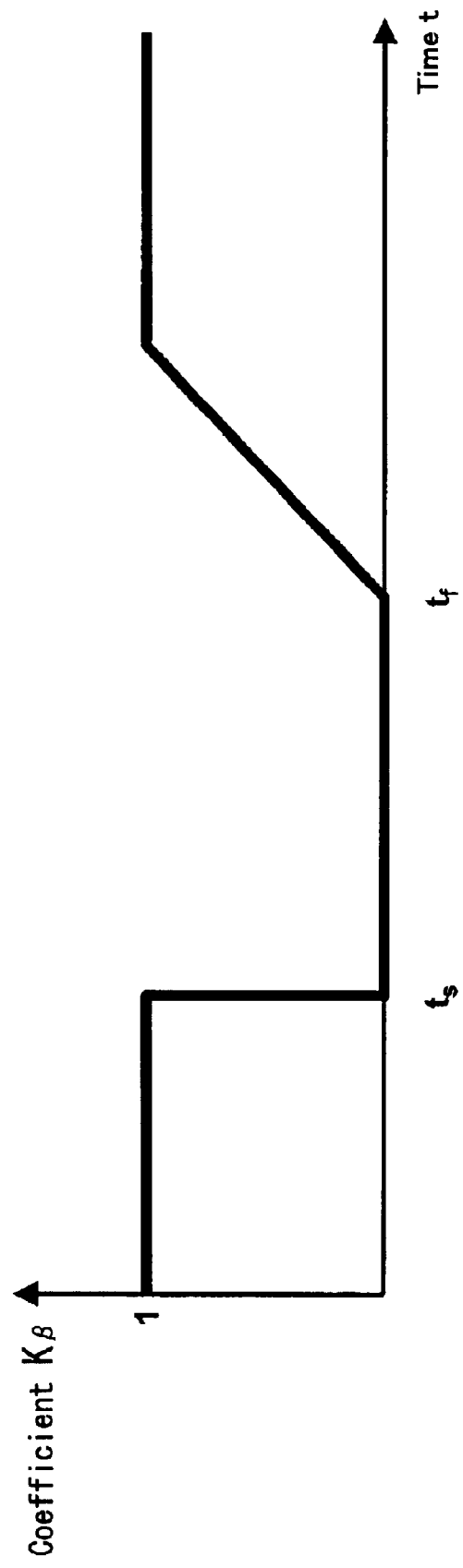
FIG. 5 is a graph illustrating a change over time of a gain adjustment coefficient.

While the gain adjustment coefficient $K_{\beta 0}$ at the start of a seek operation is set to 0.2 in the illustrated example, the gain adjustment coefficient $K_{\beta 0}$ may be any value equal to or greater than 0 and less than 1. For example, the gain adjustment coefficient $K_{\beta 0}$ may be set to 0 as illustrated in FIG. 5.

Figure 6:
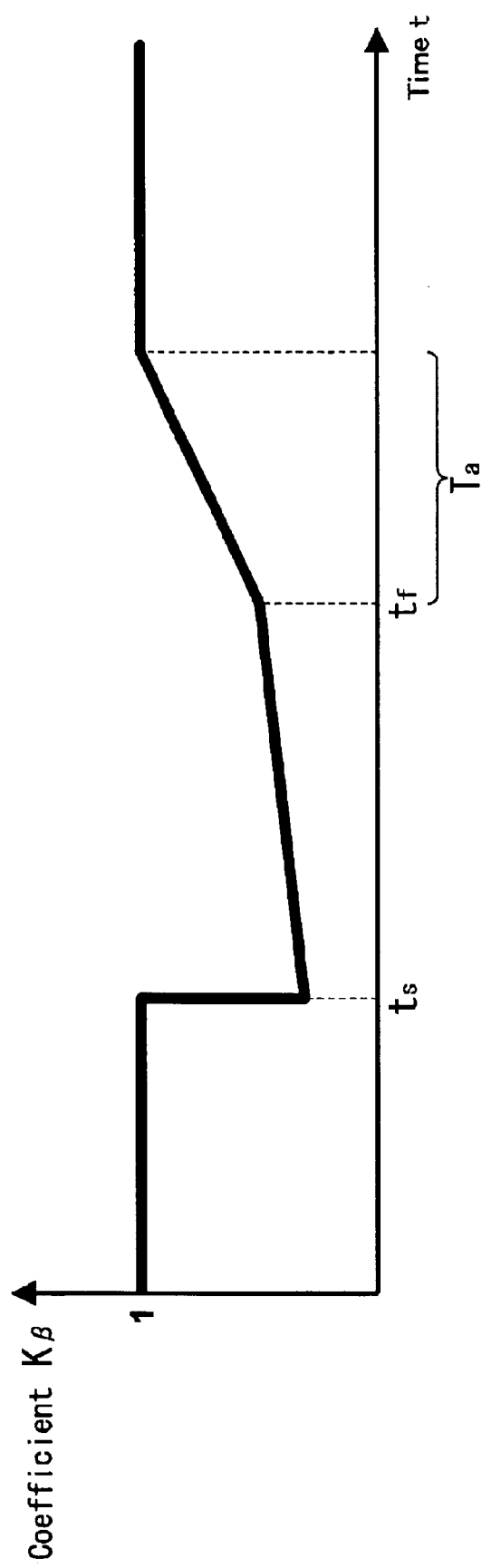
FIG. 6 is a graph illustrating a change over time of a gain adjustment coefficient.
Figure 7:
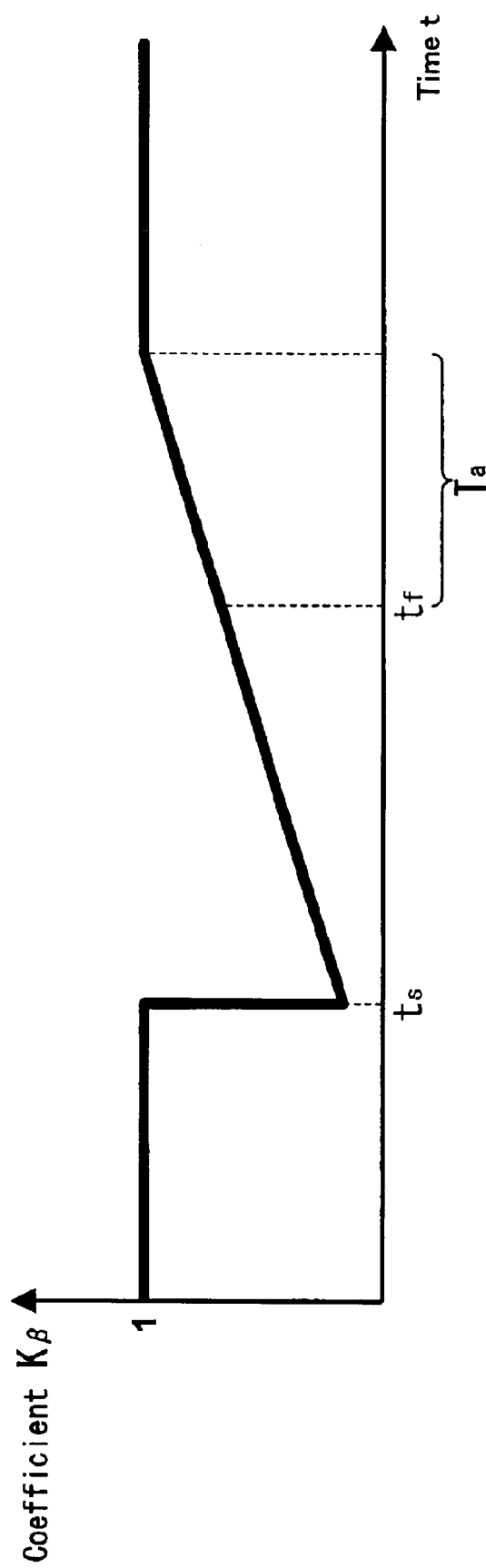
FIG. 7 is a graph illustrating a change over time of a gain adjustment coefficient.

The gain adjustment coefficient $K_\beta$ during a seek operation does not have to be a constant value. For example, the gain adjustment coefficient $K_\beta$ during a seek operation may increase over time as illustrated in FIG. 6. The rate of change of the gain adjustment coefficient $K_\beta$ during a seek operation may be smaller than that during the period Ta (transitional period) starting from time $t_f$ when the operation transitions from a seek operation to a following operation. Moreover, the change of rate of the gain adjustment coefficient $K_\beta$ during a seek operation may be equal to that during the transitional period as illustrated in FIG. 7.

Moreover, although not shown in the figures, the gain adjustment coefficient $K_\beta$ does not have to keep increasing over time throughout the transitional period as long as it generally increases over the transitional period. In other words, it may temporarily be decreasing as long as it approaches to a predetermined value over time.

Moreover, the disturbance compensation signal β to be input to the gain adjuster 14 may be set to a value slightly smaller than it would otherwise be, depending on the design of the positioning system. In such a case, the gain adjustment coefficient $K_\beta$ may appear to be greater than 1.

As described above, according to the present embodiment, the contribution of the disturbance compensation signal β to the driving signal u is adjusted with the gain adjustment coefficient $K_\beta$ according to various states such as a following state and a transitional state from a seek operation to a following operation. In this way, the transition from a seek operation to a following operation can be made within a shorter period of time. Moreover, in a state where the head is stably following the current track position x, it is possible to suppress off-track due to the disturbance $\tau_d$, thereby allowing for a very stable and precise positioning operation. Thus, it is possible to realize a reliable magnetic disk apparatus having a desirable level of performance.

Note that since the position data 60 of the magnetic disk 1 is recorded at a predetermined angular interval, as described above, the head position information obtained based on the position data 60 is discrete information. With such discrete information, it is not possible to update the head position information at an interval shorter than a predetermined sampling cycle. Therefore, if disturbance compensation is performed based only on the position information, it is not possible to quickly address a large disturbance that occurs instantaneously within a single sampling cycle. However, in the present embodiment, disturbance compensation is performed by using the induced voltage Ea occurring between the opposite ends of the driving coil 5. The information of the induced voltage Ea is not discrete but is continuous. Therefore, with the present embodiment, it is possible to perform disturbance compensation at a very short cycle. Thus, it is possible to quickly address a large disturbance that occurs instantaneously.

In the description herein, the operation of the actuator is generally classified into a seek operation and a following operation. However, it is also common in the art to classify the operation of the actuator into a seek operation, a settling operation and a following operation (a following operation in its narrow sense). Under such a classification, the settling operation and the following operation in its narrow sense correspond to the "following operation" as used herein (a following operation in its broad sense).

Note that while multipliers, adders, subtractors and integrators in the disturbance estimator 10, the disturbance compensator 11 and the gain adjuster 14 are implemented by using analog filters in the present embodiment, these elements may alternatively be implemented by using digital filters. Moreover, while the present embodiment has been directed to a magnetic disk apparatus, the present invention is not limited thereto, but may of course be used with other types of disk apparatuses such as an optical disk apparatus and an magneto-optical disk apparatus. The present invention may be used with any type of disk apparatuses.

The embodiment set forth above is merely illustrative in every respect, and should not be taken as limiting. The scope of the present invention is defined by the appended claims, and in no way is limited to the description set forth herein. Moreover, any variations and/or modifications that are equivalent in scope to the claims fall within the scope of the present invention.

What is claimed is:

1. A head positioning method for positioning a head with respect to a disk by using an actuator including a voice coil motor, an arm fixed to the voice coil motor, and the head attached to the arm, the method comprising the steps of:

producing a disturbance compensation signal by estimating a magnitude of disturbance acting upon the actuator based on a driving signal for driving the actuator and a voltage signal indicating a voltage that is generated across the voice coil motor according to driving of the actuator;

producing a control signal by multiplying the disturbance compensation signal by a gain adjustment coefficient, which is a constant other than 1 or a variable that takes a value other than 1 at any point in time;

calculating a head position error based on a target position and a head position that is obtained by detecting, with the head, servo information recorded in advance on the disk, so as to produce a position control signal corresponding to the head position error; and producing the driving signal by adding together the control signal and the position control signal.

2. The head positioning method of claim 1, wherein:
the gain adjustment coefficient is a variable; and the gain adjustment coefficient is varied according to the head position error.

3. The head positioning method of claim 2, wherein the gain adjustment coefficient is increased over time.

4. The head positioning method of claim 2, wherein the gain adjustment coefficient is brought closer to a predetermined value over time.

5. The head positioning method of claim 2, wherein the gain adjustment coefficient is brought closer to 1 over time.

6. The head positioning method of claim 2, wherein the gain adjustment coefficient in a seek mode is set to be smaller than that in a following mode.

7. The head positioning method of claim 2, wherein when the head position error is greater than a predetermined threshold position error amount, the gain adjustment coefficient is set to be smaller than that when the head position error is less than or equal to the threshold position error amount.

8. The head positioning method of claim 7, wherein the gain adjustment coefficient is increased over time, starting from a point in time when the head position error transitions from being greater than the threshold position error amount to being less than or equal to the threshold position error amount.

9. The head positioning method of claim 7, wherein the threshold position error amount is smaller than twice a recording track pitch of the disk.

10. A disk apparatus, comprising:
an actuator including a voice coil motor, an arm fixed to the voice coil motor, and a head attached to the arm;
a driver for driving the actuator;
a voltage detector for outputting a voltage signal indicating a voltage that is generated across the voice coil motor when driving the actuator;
a disturbance estimator for producing a disturbance compensation signal by estimating a magnitude of disturbance acting upon the actuator based on a driving signal input to the driver and the voltage signal;
a position error detector for calculating a head position error based on a target position and a head position that is obtained by detecting, with the head, servo information recorded in advance on a disk;
a position controller for producing and outputting a position control signal corresponding to the head position error; and
a gain adjuster for producing a control signal by multiplying the disturbance compensation signal by a gain adjustment coefficient, which is a constant other than 1 or a variable that takes a value other than 1 at any point in time, and producing the driving signal by adding together the control signal and the position control signal.

11. The disk apparatus of claim 10, wherein:
the gain adjustment coefficient is a variable; and
the gain adjustor varies the gain adjustment coefficient according to the head position error.

12. The disk apparatus of claim 11, wherein the gain adjuster increases the gain adjustment coefficient over time.

13. The disk apparatus of claim 11, wherein the gain adjuster brings the gain adjustment coefficient closer to a predetermined value over time.

14. The disk apparatus of claim 11, wherein the gain adjuster brings the gain adjustment coefficient closer to 1 over time.

15. The disk apparatus of claim 11, wherein the gain adjuster sets the gain adjustment coefficient in a seek mode to be smaller than that in a following mode.

16. The disk apparatus of claim 11, wherein when the head position error is greater than a predetermined threshold position error amount, the gain adjuster sets the gain adjustment coefficient to be smaller than that when the head position error is less than or equal to the threshold position error amount.

17. The disk apparatus of claim 16, wherein the gain adjuster increases the gain adjustment coefficient over time, starting from a point in time when the head position error transitions from being greater than the threshold position error amount to being less than or equal to the threshold position error amount.

18. The disk apparatus of claim 16, wherein the threshold position error amount is smaller than twice a recording track pitch of the disk.

* * * * *